2,868,778

PROCESS FOR EXTRACTING HEMICELLULOSE FROM CORN COARSE FIBER

Stanley A. Watson, Forest Park, and Carl B. Williams, Chicago, Ill., assignors to Corn Products Refining Company, New York, N. Y., a corporation of New Jersey No Drawing. Application April 21, 1954
Serial No. 424,778

6 Claims. (Cl. 260—209)

This invention relates to a new and novel process for obtaining polysaccharide gum from vegetable fiber. More particularly it relates to a process for obtaining vegetable gum in substantially pure form from the fiber containing by-products in the wet milling of cereal grains, such as corn and grain sorghum.

Natural vegetable gums are the dried exudate of trees, such as the acacia, and have been of commercial importance for centuries. They are used in the arts, as thickeners in foods, cosmetics and printing, as sizes in paper and textile making, and as adhesives.

Vegetable gums prepared by alkali extraction of the fruits and seeds of plants, such as locust bean and quince, also have long found commercial use. They also are thickeners, and find uses similar to the natural gums. Hemicellulose also has been extracted from wood after delignification. The bulk of these hemicelluloses is xylan, the greater part of the remainder consisting of xylose and uronic acid polymer. These hemicelluloses have had little industrial application except in the production of paper.

Studies on hemicellulose have been concerned largely with wood, and to a smaller extent with corn cobs, both of which have been poor sources of a commercially valuable hemicellulose. The known methods used to extract hemicellulose from vegetable fiber are poorly defined but have always used an alkali, such as sodium or potassium hydroxide or sodium carbonate, and when applied to fibrous materials, especially those associated with starch, result in hemicellulose which is commercially unattractive.

Vegetable gums have not been prepared in commercial quantities from carbohydrate by-products, such as corn fiber from the wet milling industry, but their laboratory preparation is known. Because of the relatively small lignin content in corn fiber, satisfactory products can be prepared without delignification. Otherwise, methods for the preparation of hemicellulose from wood fiber have been used in previous laboratory preparations. The exact nature of hemicelluloses thus prepared from vegetable fibers is not known, and probably varies with variety, pretreatment of the fiber, and the method of hemicellulose extraction. One analysis of hemicellulose extracted from corn pericarp with sodium hydroxide indicated a polymer containing 48 percent xylose, 35 percent arabinose, and 7 percent galactose as well as from 7 to 12 percent uronic acid.

The processes previously known for extracting hemicellulose from vegetable fibers have never been used commercially because they have so many disadvantages that they are impractical. For example, the color of the extracted hemicellulose due to the presence of tannins and other color bearing impurities is too high to warrant its acceptance in many fields of application. The color bodies are not readily removed by precipitation with alcohol, or decolorizing carbon unless uneconomical quantities of carbon are used. The color of the residue is usually black which detracts from the use of the residue as an ingredient in animal feed. Another disadvantage of prior art processes of obtaining hemicellulose is the fact that such hemicellulose produces relatively opaque solutions probably due to the presence of starch. A more serious disadvantage is the fact that alkalis gelatinize the starch present in the fiber which results in difficulty in separating the extract from the fiber and in starch being extracted also. The filtration of an alkali extract is extremely difficult and even with the use of filter aids is a slow and exasperating task. The ash content of the final product is high because of the high requirement of alkali. It has been necessary in previous processes to dialyze the alkali extract of vegetable fibers to purify the hemicellulose, which is a complicated and expensive procedure. Furthermore, alkalis cause foaming during the extraction and the amount of foaming increases with the time of extracting. The control of foaming becomes increasingly difficult as time goes on and foaming over during alkali extraction is not uncommon.

We have discovered that when lime, i. e., an aqueous suspension of calcium oxide or calcium hydroxide, is used under certain conditions in the extraction of hemicelluloses from vegetable fiber, all of the processing disadvantages above discussed are overcome and a product with greatly improved properties is obtained. This was a completely unexpected result inasmuch as the prior art methods specified the need of the high alkalinity furnished by caustic reagents. Furthermore, it was totally unexpected that lime would alter the characteristics of the starch, the residual carbohydrates, and protein present to such an extent that the lime extract can be filtered readily. Lime alters the gelatinization characteristics of starch to the extent that even the gelatinization ordinarily expected in water at the temperatures used, does not occur although the fibrous material swells to over twice its original volume, in contra-distinction to the effect produced by caustic reagents.

By means of our invention extracts are obtained which are easily filtered, for example in a few minutes as contrasted with hours consumed in prior art processes. Moreover, residual hemicellulose containing moisture can be squeezed out of the residue by conventional means whereas residues from caustic extraction retain larger volumes of extract which cannot be recovered by usual means. The crude extract as well as the residue are much lighter in color than those obtained by prior art methods, hence less purification is needed. Furthermore, purification of the extract is easier since calcium salts can be removed readily by precipitation with such common reagents as $CO_2$, $SO_2$, phosphoric acid, sulfuric acid, oxalic acid, etc. The color of the final product from the process of our invention is considerably lower than can be obtained by using alkali as the extracting medium. Products which give colorless solutions may be obtained readily by our process whereas prior art processes will not produce such products.

In carrying out the process of our invention, the vegetable fiber, such as corn fiber, is extracted with an aqueous suspension of lime preferably at at least reflux temperature or higher. The amount of water used is not critical but should be sufficient to provide a slurry. Excess water makes the recovery process more expensive. The pH during extraction should be above about 10.5 and this can be attained by using about 9 percent of lime, based on dry fiber basis. More than about 10 percent of lime is not deleterious but would add to the cost and would also increase residual ash. The extraction may be carried out by refluxing the mixture for 15 to 120 minutes, 60 minutes being optimum, at atmospheric pressure. If superatmospheric pressure is used, the time may be correspondingly shortened. Then the extract is separated from the residue. The residue, with or without pH adjustment, may be refluxed or washed with water to recover additional hemicellulose. The hemicellulose may be recovered from the extract by adding thereto, in excess, a solvent, such as methanol, ethanol, 2-propanol, acetone and similar solvents which precipitate the hemicellulose, or the extract may be dried directly as by spray drying and the like. However, the hemicellulose recovered in this latter manner will not be as free of impurities, e. g., color, ash, protein, as the alcohol precipitated product. In order to obtain in either case a substantially pure product which ranges from white to pale yellow in color, the pH of the extract should be adjusted to 4.5 or lower, and the resultant precipitate removed before precipitation of the hemicellulose with alcohol or drying of the extract directly as the case may be. The pH of the extract may also be lowered to about 6 and then further lowered to at least 4.5. The pH may be adjusted by the addition of any mineral acid, or organic acids, such as oxalic acid, or sulfur dioxide, or carbon dioxide. When the extract is to be dried without the solvent precipitation step, it is preferable to use an acidic material for pH adjustment which forms an insoluble salt with lime which can then be removed by filtration in order to lower the ash content of the finished product. Sulfur dioxide in addition to forming an insoluble salt with lime and thereby reducing the ash content of the finished product also exerts a bleaching effect on the hemicellulose which gives a noticeably whiter product when the extract is dried directly. When caustic is used for extraction of hemicellulose from vegetable fibers, salts cannot be thus removed and the use of sulfur dioxide does not exert a similar bleaching effect. Pure white hemicellulose cannot be obtained by prior art methods. The extract prior to direct drying may also be purified further by dialysis, treatment with ion exchange resins, decolorizing carbon, and the like. The extract treated, as above described, may be dried by heated rolls, spray drying, heating at elevated temperatures, as in an oven, or by freezing in vacuo.

Our invention is applicable to the extraction of hemicellulose from a wide variety of vegetable fibers, e. g., fiber fractions from corn wet milling or grain sorghum wet milling, such as coarse and fine fiber, endosperm, germ expeller cake, cleanings, or fractions from dry milling of corn, such as bran, as well as oat hulls, cottonseed hulls, peanut shells, wheat bran, and the like. The fractions derived from the milling of cereal grains to which our invention is applicable may be referred to as cereal brans. In the wet milling industry, these are generally called coarse fiber.

Yields of hemicellulose obtained by our process vary from 18 to 50 percent, depending on (1) efficiency of extraction, (2) number or extent of water extractions or water washings, and (3) method used for product recovery. The final product may vary from a white fluffy powder to straw-colored lumps, ash content may vary from 0.6 to 18.0 percent, nitrogen from 0.1 to 1.3 percent, and viscosity of 3 percent solutions at 30° C. from 9 to 35 cp., depending mainly on the method used for recovering the hemicellulose from the extracts.

The following examples which are for illustrative purposes only and not intended to limit the invention in any way will further illustrate the invention and its advantages over prior art processes and products.

*Example I*

One hundred g. (D. S.) corn coarse fiber containing 135 g. water was suspended in 1100 ml. boiling water containing 8.5 g. CaO and refluxed for 60 minutes at atmospheric pressure. The mixture was vacuum filtered through cloth, and the residue was refluxed for 30 minutes in 700 ml. water and filtered again. The combined filtrates were adjusted to pH 3 and 6 N HCl and poured hot into 3 volumes of methanol. The heavy, gummy precipitate was allowed to settle, transferred to a Waring Blendor and dehydrated with 500 ml. fresh methanol. The dehydrated product was filtered on a porous, fritted steel filter and dried by freezing in vacuo. The yield was 30.7 percent on a dry fiber basis. The resultant corn fiber gum was a white powder, readily soluble in water, and contained only 0.84 percent ash. Its 3 percent solution was colorless and had a viscosity at 30° C. of 21.8 cp.

*Example II*

One hundred and sixteen g. corn coarse fiber containing 57 percent moisture (50 g. D. B.) was suspended in 550 ml. hot water containing 4.25 g. CaO and refluxed for 60 minutes at atmospheric pressure, then vacuum filtered through cloth. The residue was refluxed 30 minutes further in 350 ml. water and filtered again. The combined filtrates were adjusted to pH 7.0 with 6 N HCl and filtered hot under pressure. The clear hot solution was poured into 5 volumes of methanol. The flocculent precipitate was filtered on a porous, fritted steel filter and dried by freezing in vacuo. The yield of white corn fiber gum was 22.8 percent; it had an ash content of 2.4 percent and a nitrogen content of 0.37 percent. Its 3 percent solution had a viscosity at 30° C. of 19.4 cp. and the color on the Munsell system of color notation was $$2.5Y\frac{8}{5}$$

a light straw color.

The procedure giving the purest product from all stand-points when the hemicellulose is recovered by precipitation with alcohol is as follows:

Reflux moist corn coarse fiber for 60 minutes in 11 volumes of dry water (dry basis) containing 10 percent $Ca(OH)_2$ on a dry fiber basis, and filter off the extract on a cloth filter. Reflux the residue one or more times for 30 minutes in 7 volumes of water and filter through cloth. Adjust the combined filtrates to pH 4 with HCl, add 0.5 volume of methanol and pressure filter at 60 to 70° C. using filter aid. Pour the hot filtrate into 2.5 volumes methanol, using rapid stirring. Allow the heavy precipitate to settle for 60 minutes, decant the supernatant liquid and triturate the gummy precipitate in 5 volumes of fresh methanol (Waring Blendor), then filter through a coarse fritted steel filter. Dry the filtered hemicellulose by freezing in vacuo.

*Example III*

Ninety-three g. of moist corn coarse fiber (40 g. D. B.) was refluxed for 60 minutes at atmospheric pressure in 440 ml. water containing 3.4 g. CaO, then suction filtered through cloth. The residue was refluxed 30 minutes further in 300 ml. water and filtered again. The combined filtrates (pH 11.8) were treated with $SO_2$ to lower the pH to 4.7, then pressure filtered hot, using Dicalite filter aid. The clear aqueous solution was dried directly by freezing in vacuo. The resultant fluffy corn fiber gum was very light yellow in color and had 9.6 percent ash and 1.46 percent nitrogen. Its 3 percent solution had a viscosity at 30° C. of 8.5 cp. and a pH of 6.1 and the color on the Munsell system of color notation was $$2.5Y\frac{8}{1}$$

almost colorless.

*Example IV*

Advantages, from the standpoint of filterability and product quality, realized by employing lime rather than sodium hydroxide or carbonate for extracting hemicellulose from corn coarse fiber may be seen by the following table in which parallel extractions were made using, in each case, 93 g. (40 g. D. B.) corn coarse fiber suspended in 440 ml. water for 120 minutes at reflux temperatures,

|  | NaOH | Na₂CO₃ | CaO |
|---|---|---|---|
| Reagent required, g | 3.5 | 30.0 | 3.4 |
| Number of reagent additions during run | 5 | 1 | 1 |
| Filtering time, min | 90 | 60 | 10 |
| Volume of extract, ml | 280 | 325 | 275 |
| pH of extract | 11.7 | 10.0 | 11.5 |
| Total D. S. of extract, g | 16.8 | 29.7 | 13.7 |
| 6 N HCl to adj. to pH 3.0, ml | 5.1 | 43.2 | 4.8 |
| Ash in hemicellulose, percent | 0.96 | 3.01 | 0.65 |
| Visc. of 3% soln. at 30° C., cp | 28.2 | 26.4 | 25.7 |

One of the reasons that the filtration rate is so low in the case of lime is that lime prevents gelatinization of starch whereas alkalis promote gelatinization even at temperatures below the boiling point. Furthermore, lime prevents swelling of any proteinaceous materials present in vegetable fibers. Another reason lime may have an advantage is that any fatty acids that are formed by hydrolysis of fats during the extraction will be precipitated as the insoluble calcium soap and therefore will exert no dispersing action on colored substances as would be the case with the soluble sodium soaps formed in the alkali process.

*Example V*

This example shows the advantages of our invention over prior art process when $SO_2$ is used in the purification.

Ninety-three grams of corn coarse fiber (40 g. D. B.) was refluxed 60 minutes in 440 ml. of water containing 3 ml. of 50 percent sodium hydroxide. One ml. portions of 50 percent sodium hydroxide were added at 10, 20, and 35 minutes after the original addition, making a total of 6 ml. of 50 percent sodium hydroxide. The residue was refluxed in 300 ml. of water for 30 minutes. The residue was very gelatinous and dark colored; final filtration required 4 hours. The combined filtrates were adjusted to pH 4.5 with $SO_2$ and the resultant, small organic precipitate filtered off, using Dicalite filter aid. The clear filtrate was dried by freezing in vacuo. The product had an ash content of 24.1 percent and had a brownish color. Its 3 percent solution of the product was cloudy and its viscosity at 30° C. was 8.0 cp. The color on the Munsell system of color notation was $$10.0YR \frac{5}{4}$$

a dark brown color.

It is to be noted that the color and ash in Example III where $SO_2$ was used for acidification, just as in the present example, are in extreme contrast to the present example, a most spectacular result.

We claim:

1. A process for obtaining hemicellulose from corn coarse fiber which comprises extracting the fiber with an aqueous suspension of calcium hydroxide, the amount of calcium hydroxide being sufficient to maintain the pH of the system above about 10.5 during the extraction and separating the extract from the residue and recovering the hemicellulose from the extract.

2. A process for obtaining hemicellulose from corn coarse fiber which comprises extracting the fiber with an aqueous suspension of calcium hydroxide, the amount of calcium hydroxide being sufficient to maintain the pH of the system above about 10.5 during the extraction, separating the extract from the residue, lowering the pH of the extract to at least 4.5, separating the precipitated material from the extract, and recovering the hemicellulose from the extract.

3. Process according to claim 2 wherein the pH is adjusted to at least 4.5 with sulfur dioxide.

4. Process according to claim 2 wherein the extraction is carried out at at least reflux temperature.

5. Process according to claim 2 wherein the pH is lowered to about 6 with carbon dioxide and then further lowered to at least 4.5.

6. Process according to claim 2 wherein the pH is adjusted to at least 4.5 with phosphoric acid.

References Cited in the file of this patent

UNITED STATES PATENTS

| 2,073,616 | Acree | Mar. 16, 1937 |
| 2,218,567 | White | Oct. 22, 1940 |
| 2,685,579 | Wimmer | Aug. 3, 1954 |
| 2,709,699 | Wolf et al. | May 31, 1955 |
| 2,801,955 | Rutenberg et al. | Aug. 6, 1957 |

OTHER REFERENCES

Kleinert et al.: Chem. Abstracts, 45, 6839 (1951).

UNITED STATES PATENT OFFICE
CERTIFICATE OF CORRECTION

Patent No. 2,868,778                                                   January 13, 1959

Stanley A. Watson et al.

It is hereby certified that error appears in the above numbered patent requiring correction and that the said Letters Patent should read as corrected below.

In the grant, lines 2, 3 and 4, for "assignors to Corn Products Refining Company, of New York, N. Y., a corporation of New Jersey," read -- assignors to Corn Products Company, a corporation of New Jersey, --; line 13, for "Corn Products Refining Company, its successors" read -- Corn Products Company, its successors --; in the heading to the printed specification, lines 5, 6 and 7, for "assignors to Corn Products Refining Company, New York, N. Y., a corporation of New Jersey" read -- assignors to Corn Products Company, a corporation of New Jersey --.

Signed and sealed this 6th day of October 1959.

(SEAL)
Attest:

KARL H. AXLINE
Attesting Officer

ROBERT C. WATSON
Commissioner of Patents